(12) United States Patent
Zagni

(10) Patent No.: US 10,728,118 B2
(45) Date of Patent: Jul. 28, 2020

(54) SERVICE TICKETS EARLY WARNING SYSTEM

(71) Applicant: Intelenz, Inc., Union City, CA (US)

(72) Inventor: Renzo Zagni, Union City, CA (US)

(73) Assignee: Intelenz, Inc., Union City, CA (US)

( * ) Notice: Subject to any disclaimer, the term of this patent is extended or adjusted under 35 U.S.C. 154(b) by 247 days.

(21) Appl. No.: 15/834,014

(22) Filed: Dec. 6, 2017

(65) Prior Publication Data

US 2019/0173767 A1 Jun. 6, 2019

(51) Int. Cl.
*H04L 12/24* (2006.01)
*G06Q 10/06* (2012.01)

(52) U.S. Cl.
CPC .... *H04L 41/5074* (2013.01); *G06Q 10/06311* (2013.01); *H04L 41/5022* (2013.01)

(58) Field of Classification Search
None
See application file for complete search history.

(56) References Cited

U.S. PATENT DOCUMENTS

| | | | |
|---|---|---|---|
| 6,505,166 B1* | 1/2003 | Stephanou | G06Q 10/063112 705/7.14 |
| 8,903,933 B1* | 12/2014 | Bellini, III | H04L 29/08837 707/705 |
| 2007/0133755 A1* | 6/2007 | Jean | H04M 3/26 379/1.01 |
| 2012/0023044 A1* | 1/2012 | Anerousis | G06N 5/043 706/12 |
| 2014/0032254 A1* | 1/2014 | Della Corte | G06Q 30/016 705/7.14 |
| 2014/0129536 A1* | 5/2014 | Anand | G06Q 10/0635 707/706 |
| 2015/0346918 A1* | 12/2015 | Bodda | G06Q 10/06313 715/825 |
| 2015/0347950 A1* | 12/2015 | Goyal | G06Q 10/06393 705/7.39 |
| 2018/0060786 A1* | 3/2018 | Venkataraman | G06Q 10/063112 |

* cited by examiner

*Primary Examiner* — Thomas J Dailey

(57) ABSTRACT

Service tickets early warning can include: storing a set of service tickets such that the service tickets are accessible by a set of interested individuals, each service ticket describing one or more service issues to be acted upon by one or more service agents; recording a set of parameters describing each of a set of accesses to the service tickets undertaken by one or more of the interested individuals; and generating an early warning of an urgency of one or more of the service tickets by extracting a set of features pertaining to the accesses and sorting the service tickets based on the features extracted.

16 Claims, 11 Drawing Sheets

SERVICE TICKETS EARLY WARNING SYSTEM

BACKGROUND

Service tickets can be used to communicate a variety of service issues to a group of service agents who are skilled at handling the service issues. For example, service tickets can be used to communicate information technology (IT) service issues to a group of IT service agents.

Service tickets can be distributed to a group of service agents based on priorities assigned to the service tickets when created. For example, service tickets assigned a high priority when created can be distributed to available service agents ahead of service tickets assigned a lower priority when created.

A variety of changing circumstances can cause substantial increases in the urgencies of service tickets. Unfortunately, a service tickets system can process such a large number of service tickets that it may be impossible for human beings to know which service tickets require immediate attention.

SUMMARY

In general, in one aspect, the invention relates to a service tickets early warning system. The service tickets early warning system can include: a service tickets store for holding a set of service tickets, each service ticket describing one or more service issues to be acted upon by one or more service agents; an access logger for recording a set of parameters describing each of a set of accesses to the service tickets undertaken by one or more of a set of interested individuals; and a ticket temperature analyzer for generating an early warning of an urgency of one or more of the service tickets by extracting a set of features pertaining to the accesses and sorting the service tickets based on the features extracted.

In general, in another aspect, the invention relates to a method for service tickets early warnings. The method can include: storing a set of service tickets such that the service tickets are accessible by a set of interested individuals, each service ticket describing one or more service issues to be acted upon by one or more service agents; recording a set of parameters describing each of a set of accesses to the service tickets undertaken by one or more of the interested individuals; and generating an early warning of an urgency of one or more of the service tickets by extracting a set of features pertaining to the accesses and sorting the service tickets based on the features extracted.

Other aspects of the invention will be apparent from the following description and the appended claims.

BRIEF DESCRIPTION OF THE DRAWINGS

Embodiments of the present invention are illustrated by way of example, and not by way of limitation, in the figures of the accompanying drawings and in which like reference numerals refer to similar elements.

DETAILED DESCRIPTION

Figure 1:
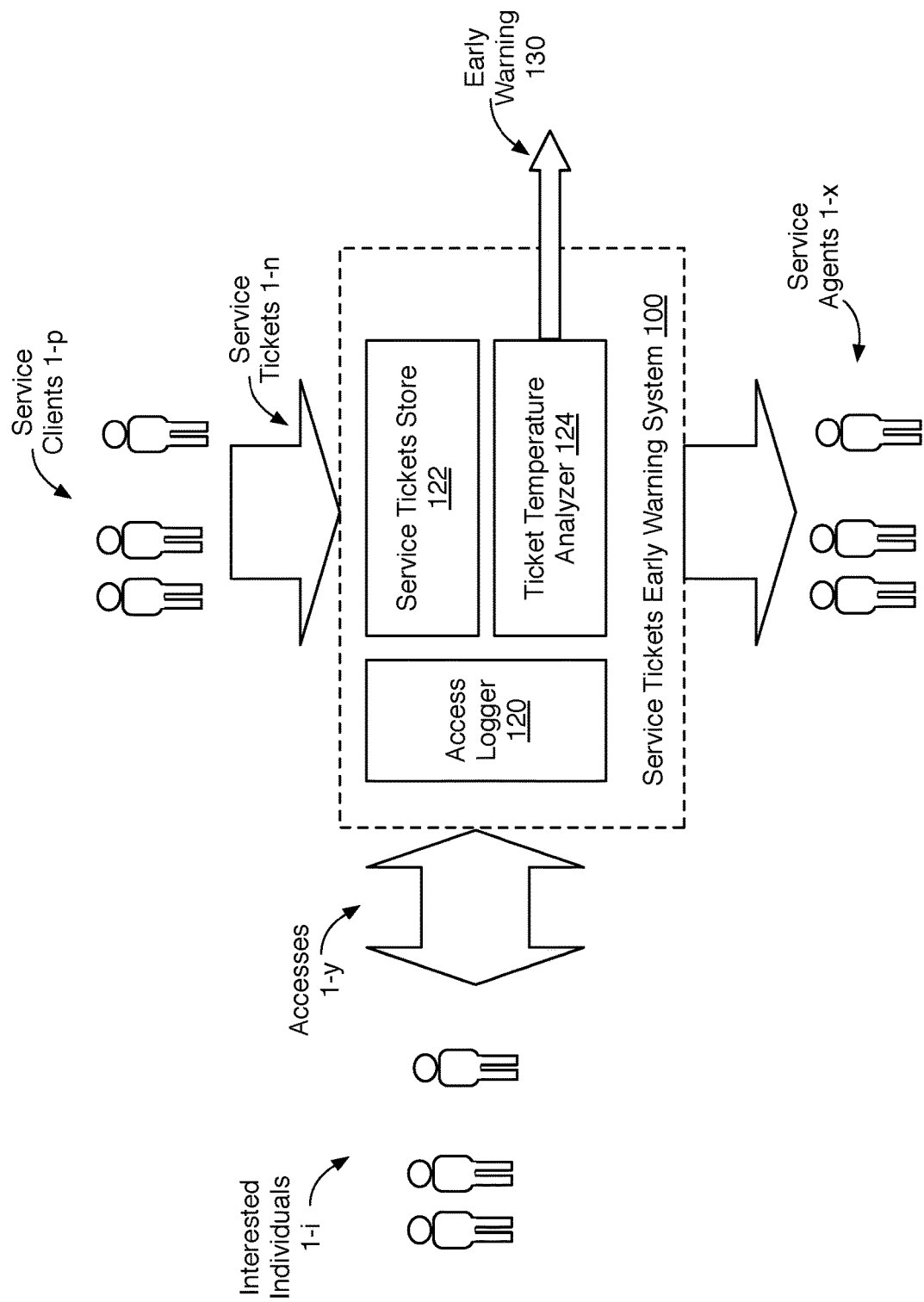
FIG. 1 illustrates a service tickets early warning system in one or more embodiments.

Reference will now be made in detail to the various embodiments of the present disclosure, examples of which are illustrated in the accompanying drawings. Like elements in the various figures are denoted by like reference numerals for consistency. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, have not been described in detail so as not to unnecessarily obscure aspects of the present disclosure.

FIG. 1 shows a service tickets early warning system 100 in one or more embodiments. The service tickets early warning system 100 includes a service tickets store 122 for holding a set of service tickets 1-$n$. Each service ticket 1-$n$ describes one or more service issues to be acted upon by one or more of a set of service agents 1-$x$. In one or more embodiments, the service tickets 1-$n$ are created by a set of service clients 1-$p$.

The service tickets early warning system 100 includes an access logger 120 for recording a set of parameters describing each of a set of accesses 1-$y$ to the service tickets 1-$n$ undertaken by one or more of a set of interested individuals 1-$i$. The interested individuals 1-$i$ can include anyone who has an interest in seeing the service issues described in one or more of the service tickets 1-$n$ handled in a timely manner. For example, the interested individuals 1-$i$ can include any of the service clients 1-$p$, their bosses, supervisors, admins, etc., as well as any of the service agents 1-$x$, their bosses, supervisors, admins, etc.

The service tickets early warning system 100 includes a ticket temperature analyzer 124 for generating an early warning 130 of an urgency of one or more of the service tickets 1-n. In one or more embodiments, the ticket temperature analyzer 124 generates the early warning 130 by extracting a set of features pertaining to the accesses 1-y and the service tickets 1-n and sorting the service tickets 1-n based on the features extracted.

In one or more embodiments, the ticket temperature analyzer 124 detects an urgency of one or more of the service tickets 1-n based on the content of the service tickets 1-n. For example, a service ticket can include keywords, phrases, concepts, etc., in annotations or in original content indicating urgency.

In one or more embodiments, the ticket temperature analyzer 124 detects an urgency of one or more of the service tickets 1-n based on the numbers of times the service tickets 1-n are accessed by the interested individuals 1-i. For example, if the service ticket 1 is accessed a relatively large number of times, it can be taken as an indicator that the service ticket 1 has increased in urgency since it was created.

In one or more embodiments, the ticket temperature analyzer 124 detects an urgency of one or more of the service tickets 1-n based on the timing of the accesses 1-y. For example, if the service ticket 1 is accessed with increasing frequency, it can be taken as an indicator that the service ticket 1 has increased in urgency since it was created.

In one or more embodiments, the ticket temperature analyzer 124 detects an urgency of one or more of the service tickets 1-n based on the relative importance of the interested individuals 1-i who undertake the accesses 1-y. For example, if an important official or a representative of an important customer accesses the service ticket 1, it can be taken as an indicator that the service ticket 1 has increased in urgency since it was created.

In one or more embodiments, the ticket temperature analyzer 124 detects an urgency of one or more of the service tickets 1-n based on annotations made to the service tickets 1-n by the interested individuals 1-i. For example, if the service ticket 1 includes annotations with keywords, phrases, concepts, etc., indicating urgency, then such content can be taken as an indication that the service ticket 1 has increased in urgency since it was created.

In various embodiments, the ticket temperature analyzer 124 detects an urgency of one or more of the service tickets 1-n based on any combination of the contents of the service tickets 1-n, the numbers of times the service tickets 1-n are accessed, the timing of the accesses 1-y, the relative importance of the interested individuals 1-y who undertake the accesses 1-y, and the contents of annotations, edits, etc., made to the service tickets 1-n.

The early warning 130 can be a message or set of messages to one or more designated individuals. For example, the early warning 130 can be an email, an instant message, a popup message, etc., to one or more of the service agents 1-x, to a supervisor or coordinator of the service agents 1-x, an official up the chain of command from the service agents 1-x, etc.

The service agents 1-x can be any type of service agents. For example, the service agents 1-x can be technical support personnel, e.g., information technology troubleshooters for a corporation or other type of organization. In other examples, the service agents 1-x can be personnel of a human resources department of an organization, programmers in a software development team of a corporation or other type of organization, field service personnel, sales personnel, etc., to name just a few examples.

For example, in an embodiment in which the service agents 1-x are personnel of a human resources department, the service tickets 1-n can include questions or describe problems or issues related to the field of human resources, e.g., benefits, pay, harassment, work environment issues, etc. In an example embodiment in which the service agents 1-x are information technology support personnel, the service tickets 1-n can include questions or describe problems or issues related to deployed information technology, e.g., hardware, software, training, upgrades, etc. In an example embodiment in which the service agents 1-x are members of a software development team, the service tickets 1-m can specify new coding projects or describe problems or issues related to existing software.

Figure 2:
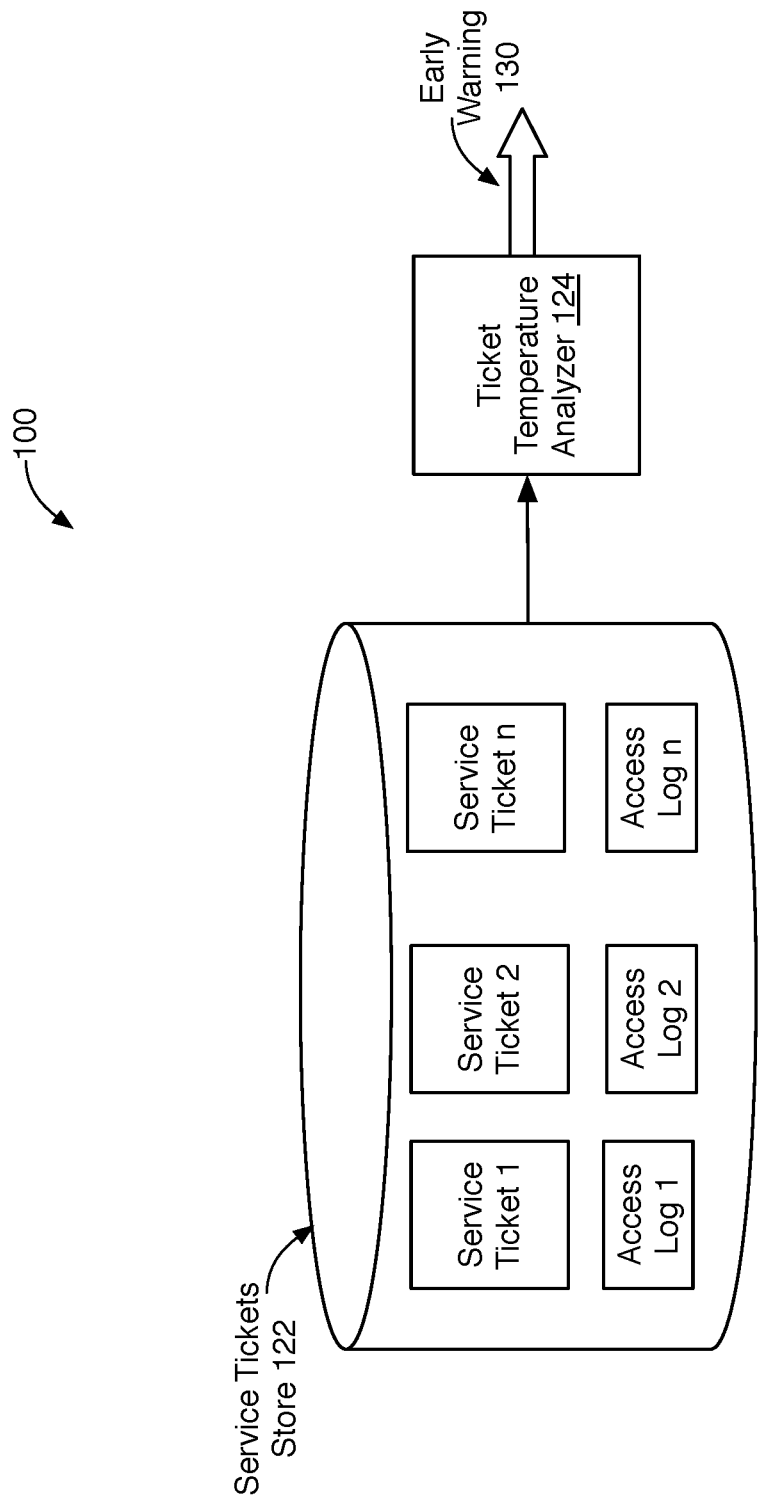
FIG. 2 shows a service tickets store holding a set of service tickets and corresponding access logs in one or more embodiments.

FIG. 2 illustrates the contents of the service tickets store 122 in one or more embodiments. The service tickets store 122 holds the service tickets 1-n. The service tickets 1-n in the service tickets store 122 can include service tickets awaiting distribution to the service agents 1-x as well as service tickets that have already been assigned, distributed to the service agents 1-x. In one or more embodiments, the service tickets 1-n are distributed from the service tickets store 122 to the service agents 1-x according to a nominal distribution scheme, e.g., first-in-first-out, priorities assigned by the service clients 1-p, etc.

In one or more embodiments, the service tickets store 122 also holds a set of access logs 1-n for recording parameters obtained by the access logger 120. For example, the access log 1 records a set of parameters pertaining to the accesses 1-y made to the service ticket 1 by the interested individuals 1-i, and the access log 2 records a set of parameters pertaining to the accesses 1-y made to the service ticket 2 by the interested individuals 1-i, etc. The access logs 1-n can be stored along with the service tickets 1-n in, e.g., the same database, or can be stored in a separate database or store, e.g., a distributed store, etc.

Examples of the parameters recorded in the access logs 1-n include the time an access occurred, e.g., a timestamp, whether an access is a view, an edit, an annotation, etc., an identifier of the interested individual 1-i who made an access, and the content of any annotations, edits, etc., made to a service ticket during an access.

In one or more embodiments, the ticket temperature analyzer 124 generates the early warning 130 by extracting a set of features pertaining to the accesses 1-y from the access logs 1-n and sorting the service tickets 1-n based on the features extracted. In one or more embodiments, the features extracted from the access logs 1-n are selected and weighted for their utility in indicating an urgency. Examples of the features extracted from the access logs 1-n include the ranks of the interested individuals 1-i who access the service tickets 1-n, the timing of the accesses 1-y to the service tickets 1-n, and the content, e.g., keywords and phrases, concepts, voluminousness, etc., of the accesses 1-y to the service tickets 1-n.

Figure 3:
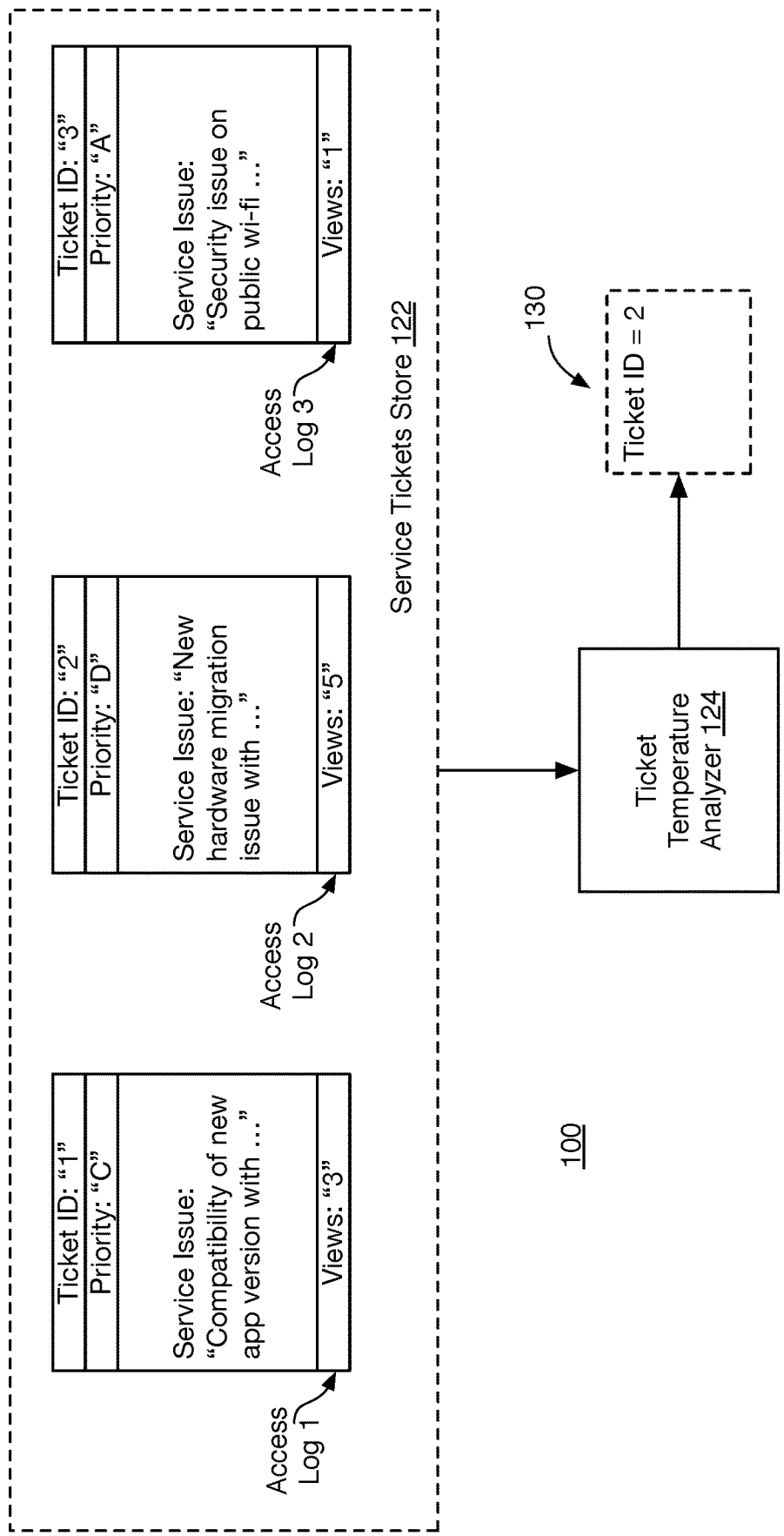
FIG. 3 shows an example of how a ticket temperature analyzer generates an early warning based on the numbers of views of a set of service tickets.

FIG. 3 shows an example of how the ticket temperature analyzer 124 generates the early warning 130 based on the numbers of views of the service tickets 1-n by the interested individuals 1-i. In this example, the respective access logs 1-3 for the service tickets 1-3 (Ticket IDs 1, 2, and 3) each include records of the numbers of views of the service tickets 1-3 by the interested individuals 1-i. The access logs 1-3 in this example indicate three views for the service ticket 1, five views for the service ticket 2, and one view for the service ticket 3. The ticket temperature analyzer 124 extracts the numbers of views from the access logs 1-3 and selects the service ticket 2 (Ticket ID=2) for the early warning 130 based on its larger number of views in this example.

Figure 4:
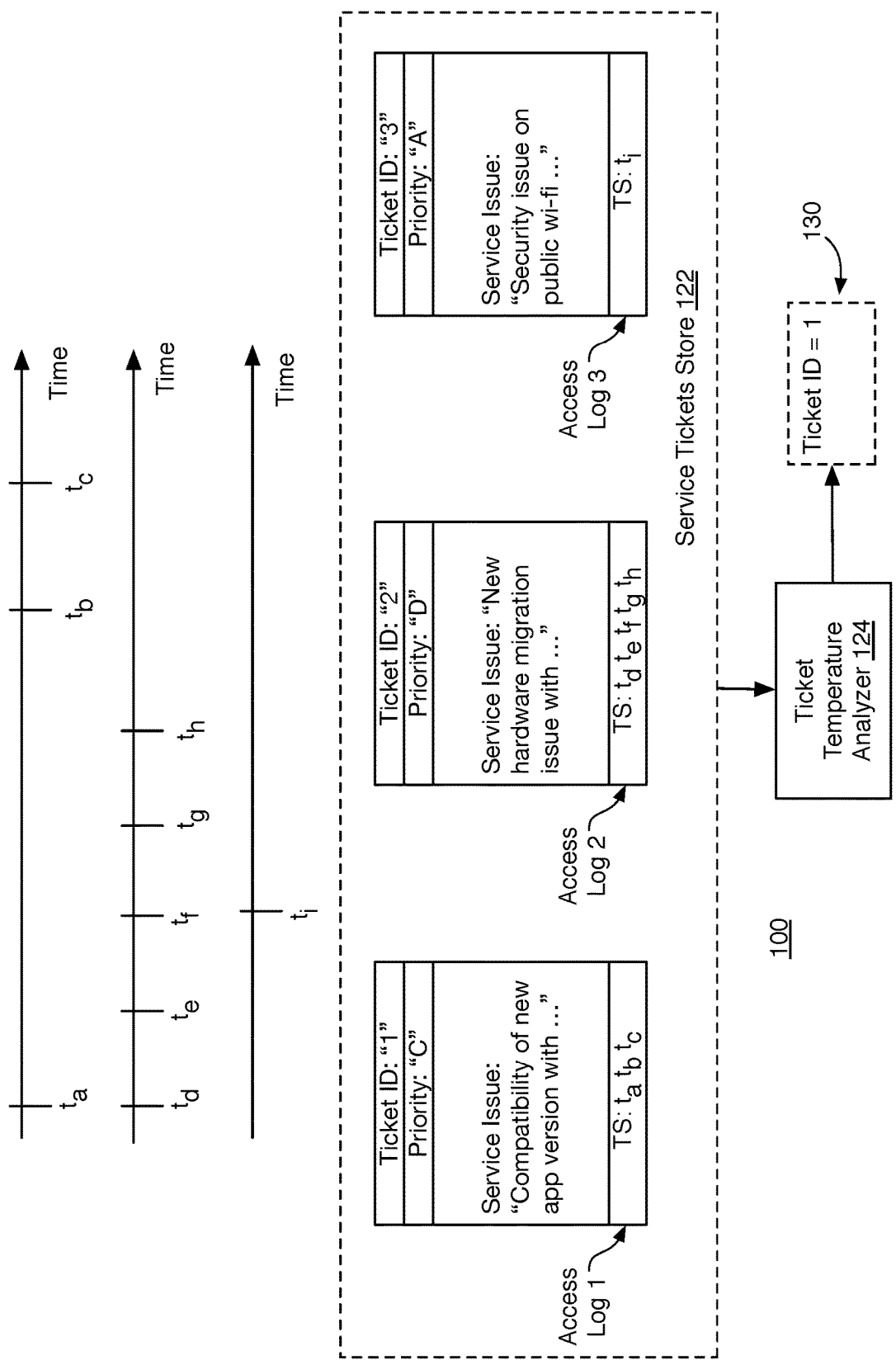
FIG. 4 shows an example of how a ticket temperature analyzer generates an early warning based on a timing of the views of a set of service tickets.

FIG. 4 shows an example of how the ticket temperature analyzer 124 generates the early warning 130 based on the timing of the accesses of the service tickets 1-*n* recorded in the access logs 1-*n*. In this example, the access logs 1-3 include timestamps (TS) indicating accesses of the service ticket 1 at times $t_a$, $t_b$, and $t_c$, accesses of the service ticket 2 at times $t_d$, $t_e$, $t_f$, $t_g$, and $t_h$, and an access of the service ticket 3 at time $t_i$. The ticket temperature analyzer 124 selects the service ticket 1 (Ticket ID=1) for the early warning 130 in this example because, although the service ticket 2 has more accesses, the service ticket 2 has a recent increase in rate of accesses.

Figure 5:
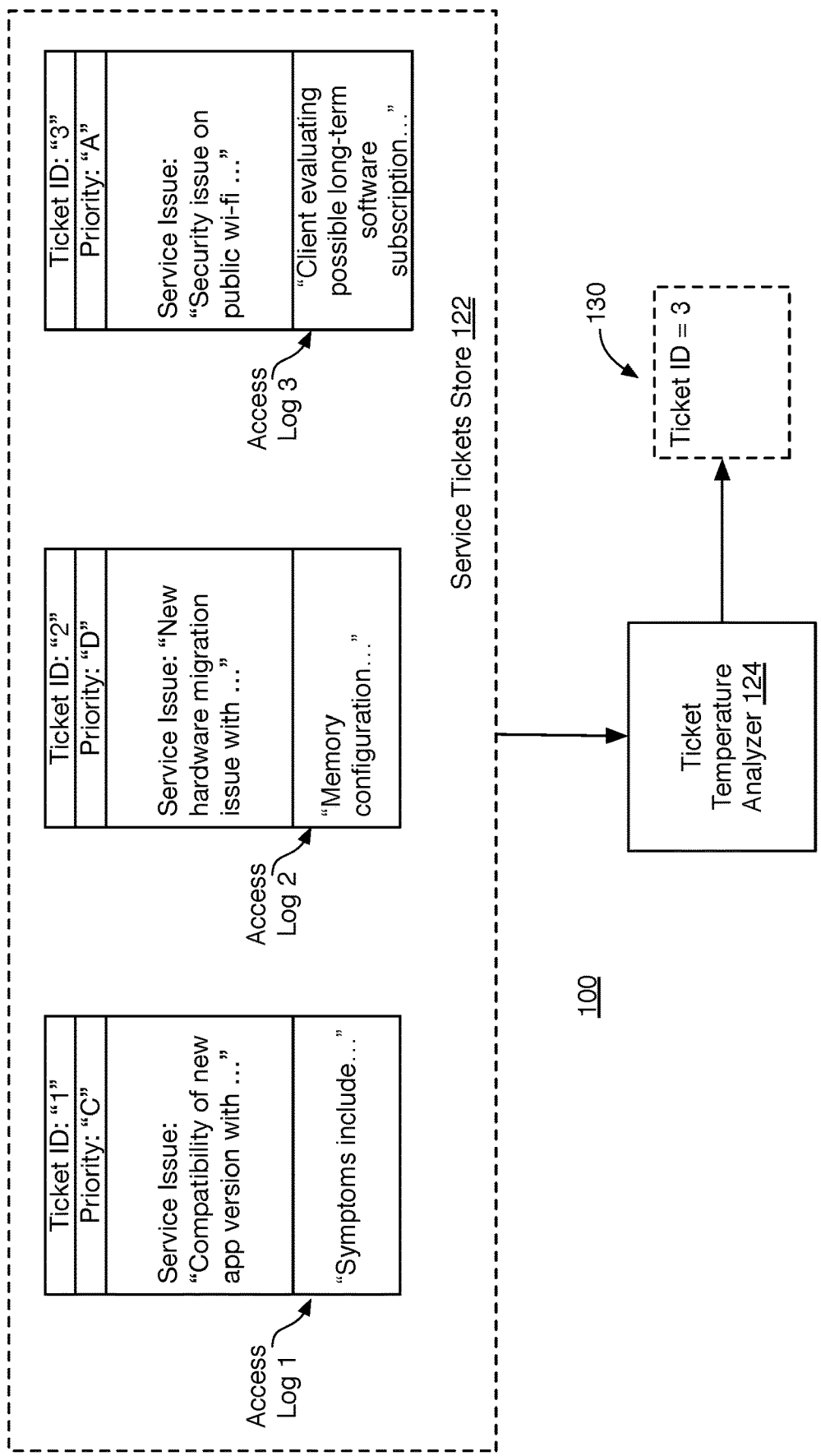
FIG. 5 shows an example of how a ticket temperature analyzer generates an early warning based on the content of annotations to a set of service tickets.

FIG. 5 shows an example of how the ticket temperature analyzer 124 generates the early warning 130 based on the content of annotations to the service tickets 1-*n* by the interested individuals 1-*i*. In this example, the text of the annotations to the service tickets 1-3 by the interested individuals 1-*i* are recorded in the access logs 1-3. The ticket temperature analyzer 124 selects the service ticket 3 for the early warning 130 based on the content of the annotations recorded in the annotations logs 1-3 because the "client evaluation" and the "possible long-term software subscription" features in the access log 3 indicate greater urgency.

Figure 6:
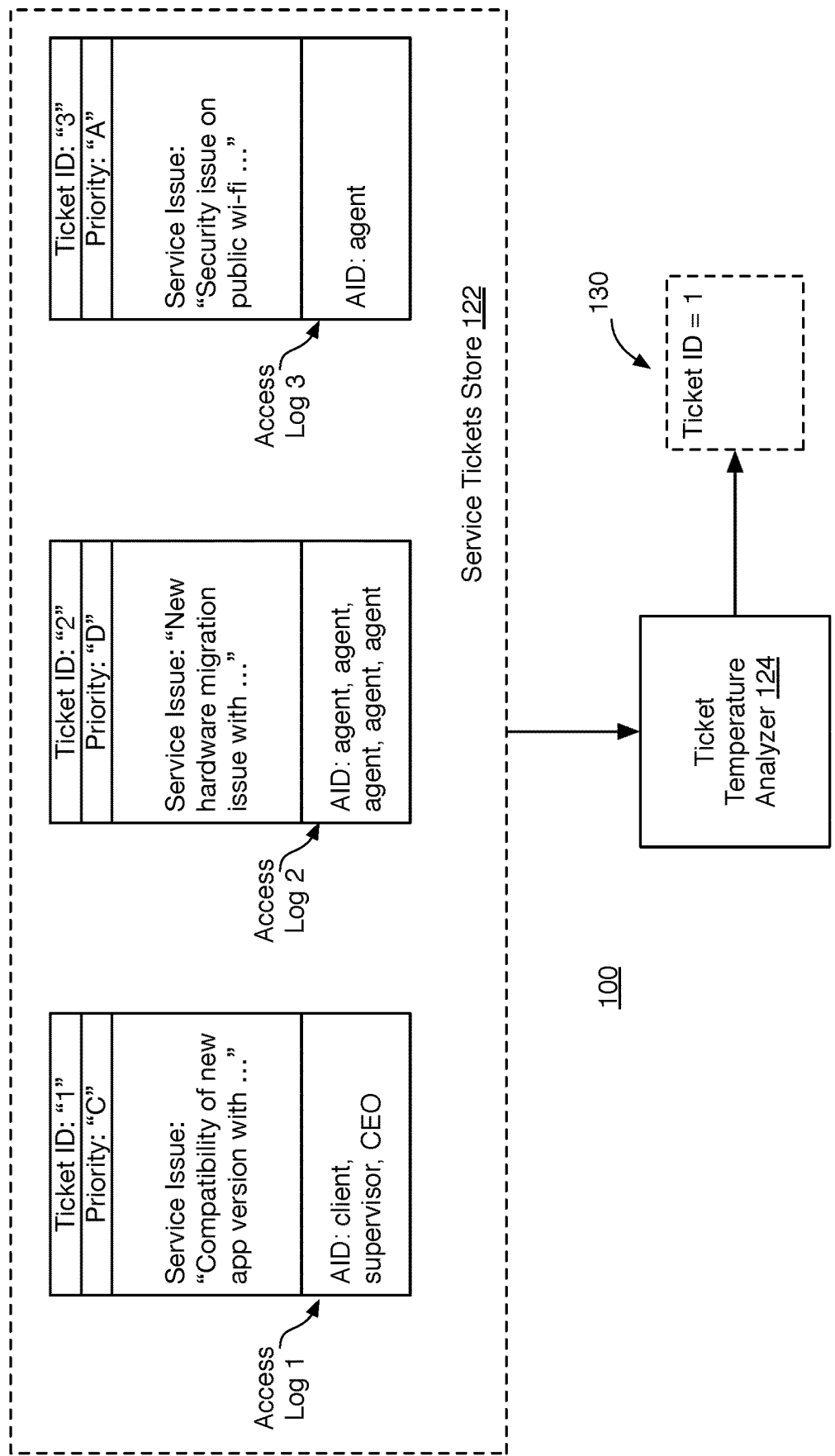
FIG. 6 shows an example of how a ticket temperature analyzer generates an early warning based on the ranks of a set of interested individuals who access a set of service tickets.

FIG. 6 shows an example of how the ticket temperature analyzer 124 generates the early warning 130 based on the ranks of the interested individuals 1-*i* who view the service tickets 1-*n*. In this example, the access logs 1-3 include accessor identifiers (AID) indicating accesses of the service ticket 1 by a client and a supervisor and a CEO, accesses of the service ticket 2 by five service agents, and an access of the service ticket 3 by a service agent. The ticket temperature analyzer 124 selects the service ticket 1 (Ticket ID=1) for the early warning 130 in this example because, although the service ticket 2 has more accesses, the service ticket 1 has been accessed by more important individuals.

Figure 7:
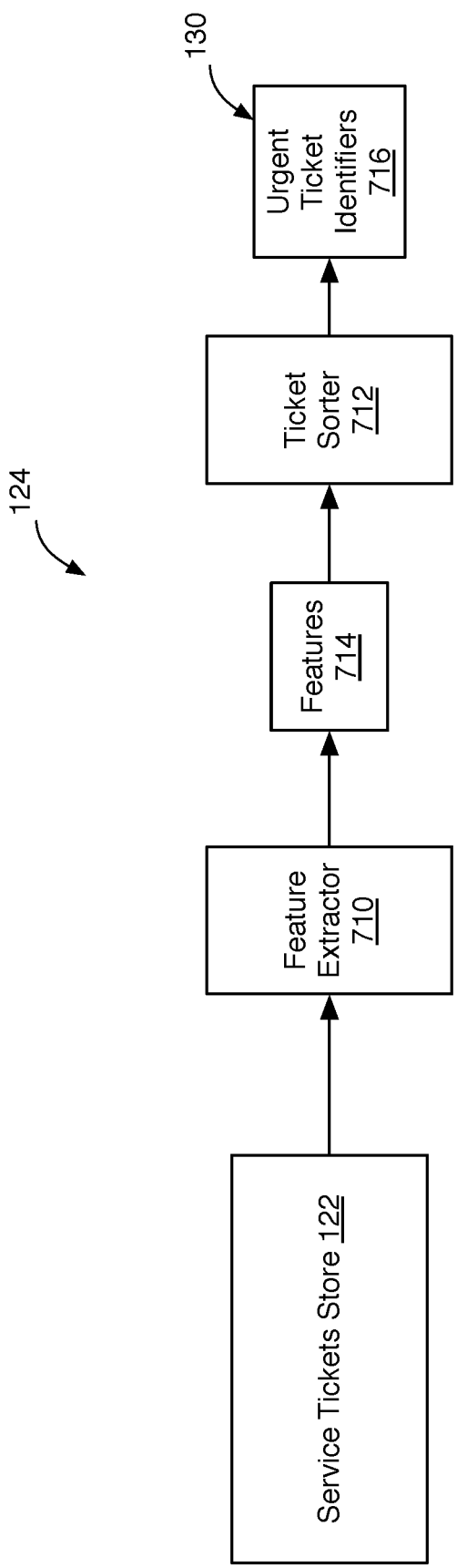
FIG. 7 illustrates a ticket temperature analyzer in one or more embodiments.

FIG. 7 illustrates the ticket temperature analyzer 124 in one or more embodiments. The ticket temperature analyzer 124 includes a feature extractor 710 that extracts a set of features 714 from the service tickets store 122. For example, the features 714 include a set of features extracted from the service ticket 1 and the access log 1, a set of features extracted from the service ticket 2 and the access log 2, etc.

The features 714 can pertain to who are the interested individuals 1-*i* who undertake the accesses 1-*y* of the service tickets 1-*n*. For example, the features extracted for the service ticket 1 can include a set of identification information associated with one or more of the interested individuals 1-*i*, e.g., names or other identifiers, organizational ranks, indicators of relative importance in an organizational hierarchy, positions with a client, importance of the clients, etc., timing of views and annotations made by important individuals, individuals of high rank, individuals associated with important clients, etc. The feature extractor 710 can use natural language processing or other AI techniques to discern ranks, relative importance, organizational relationships, etc.

The features 714 can pertain to a content of a set of annotations to the service tickets 1-*n*. For example, the features extracted for the service ticket 1 can include occurrences of key words, phrases, etc., in annotations, edits, etc., to the service ticket 1, numbers of words in the annotations to the service ticket 1, contextual, conceptual parameters extracted from the annotations to the service ticket 1, etc., identification information for the individuals who make annotations to the service ticket 1 deemed urgent, etc. The feature extractor 710 can use natural language processing or other AI techniques to discern keywords and phrases, concepts, etc.

The features 714 can pertain to a timing of a set of annotations to the service tickets 1-*n*. For example, the features extracted for the service ticket 1 can include a count of the annotations to the service ticket 1, a rate of annotations to the service ticket 1, an increase in the rate of annotations to the service ticket 1, etc., identification information for the individuals who make frequent annotations of the service ticket 1, or with increasing frequency, etc.

The features 714 can pertain to a timing of a set of views of the service tickets 1-*n*. For example, the features extracted for the service ticket 1 can include a count of the views of the service ticket 1, a rate of views of the service ticket 1, an increase in the rate of views of the service ticket 1, etc., identification information for the individuals who undertake frequent views of the service ticket 1, or with increasing frequency, etc.

The features 714 extracted by the feature extractor 710 can include any combination of features pertaining to who are the interested individuals 1-*i* who undertake the accesses 1-*y*, features pertaining to a content of annotations to the service tickets 1-*n*, features pertaining to a timing of a set of annotations to the service tickets 1-*n*, and features pertaining to a timing of a set of views of the service tickets 1-*n*.

The ticket temperature analyzer 124 includes a ticket sorter 712 that generates a set of urgent ticket identifiers 716 indicating which of the service tickets 1-*n* are urgent. In one or more embodiments, the ticket sorter 712 sorts the service tickets 1-*n* into urgent and non-urgent ticket clusters based on the features 714 extracted by the feature extractor 710.

The ticket sorter 712 can perform one or more of a variety of clustering methods, e.g., spectral clustering, to sort the service tickets 1-*n* based on the features 714. The ticket sorter 712 can apply weights to the features 714 when clustering. The weights applied to the features 714 can be determined using a variety of artificial intelligence methods, e.g., genetic programming, supervised learning, etc. The weights applied to the features 714 can be derived from historical data pertaining to service tickets that have previously been deemed urgent.

Figure 8:
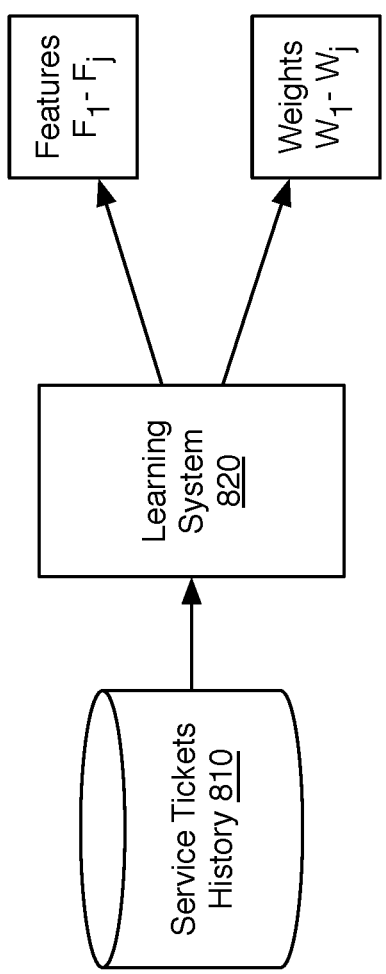
FIG. 8 shows how in one or more embodiments a learning system derives a set of features and corresponding weights for a ticket temperature analyzer from a service tickets history.

FIG. 8 shows a learning system 820 for deriving from a service tickets history 810 a set of features $F_1$-$F_j$ to be extracted by the ticket temperature analyzer 124 and a set of corresponding weights $W_1$-$W_j$. The service tickets history 810 in one or more embodiments holds a historical record of a variety of urgent service tickets and corresponding access logs.

The learning system 820 can perform an iterative process in which a set of initial features $F_1$-$F_j$ and weights $W_1$-$W_j$ are chosen. The initial features $F_1$-$F_j$ can be used to extract a set of features from the urgent service tickets recorded in service tickets history 810 and to test the effectiveness of the current features $F_1$-$F_j$ and weights $W_1$-$W_j$ in identifying urgent service tickets by applying the weights $W_1$-$W_j$ to the extracted features. Subsequent iterations can be used to refine into the features $F_1$-$F_j$ and weights $W_1$-$W_j$ for the use by the ticket temperature analyzer 124. The learning system 820 can employ one or more of a variety of artificial intelligence methods, e.g., genetic programming, supervised learning, etc., to refine into the features $F_1$-$F_j$ and weights $W_1$-$W_j$ for the use by the ticket temperature analyzer 124.

Figure 9:
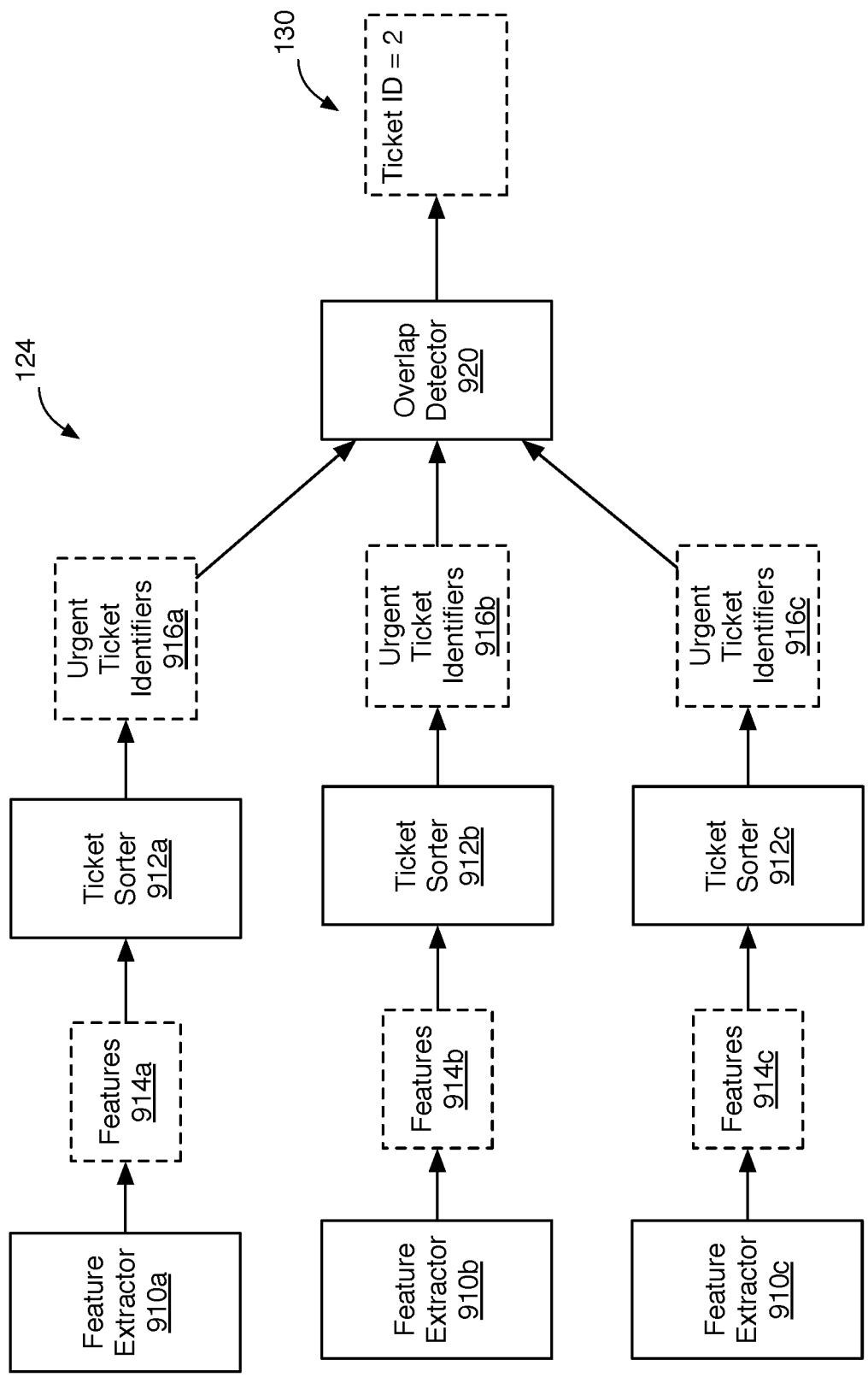
FIG. 9 illustrates a ticket temperature analyzer in one or more embodiments in which feature extraction and clustering are based on multiple discrete aspects of a set of service tickets.

FIG. 9 illustrates the ticket temperature analyzer 124 in one or more embodiments in which feature extraction and clustering is based on multiple discrete aspects of the service tickets 1-*n*. In this example, the ticket temperature analyzer 124 includes a feature extractor 910a that extracts a set of features 914a pertaining to who undertakes the accesses 1-y, a feature extractor 910b that extracts a set of features 914b pertaining to a timing of annotations to and views of the service tickets 1-n, and a feature extractor 910c that extracts a set of features 914c pertaining to a content of annotations to the service tickets 1-n. The urgency detector 212 includes respective ticket sorters 912a-c that generate respective sets of urgent ticket identifiers 916a-c by sorting the service tickets 1-n into urgent and non-urgent groups based on the features 914a-c, respectively.

The ticket temperature analyzer 124 includes an overlap detector 920 that determines which of the service tickets 1-n are identified in more than one of the urgent ticket identifiers 916a-c sets. In this example, the service ticket 2 is identified in more than one of the urgent ticket identifiers 916a-c sets and is selected as the basis of the early warning 130.

Figure 10:
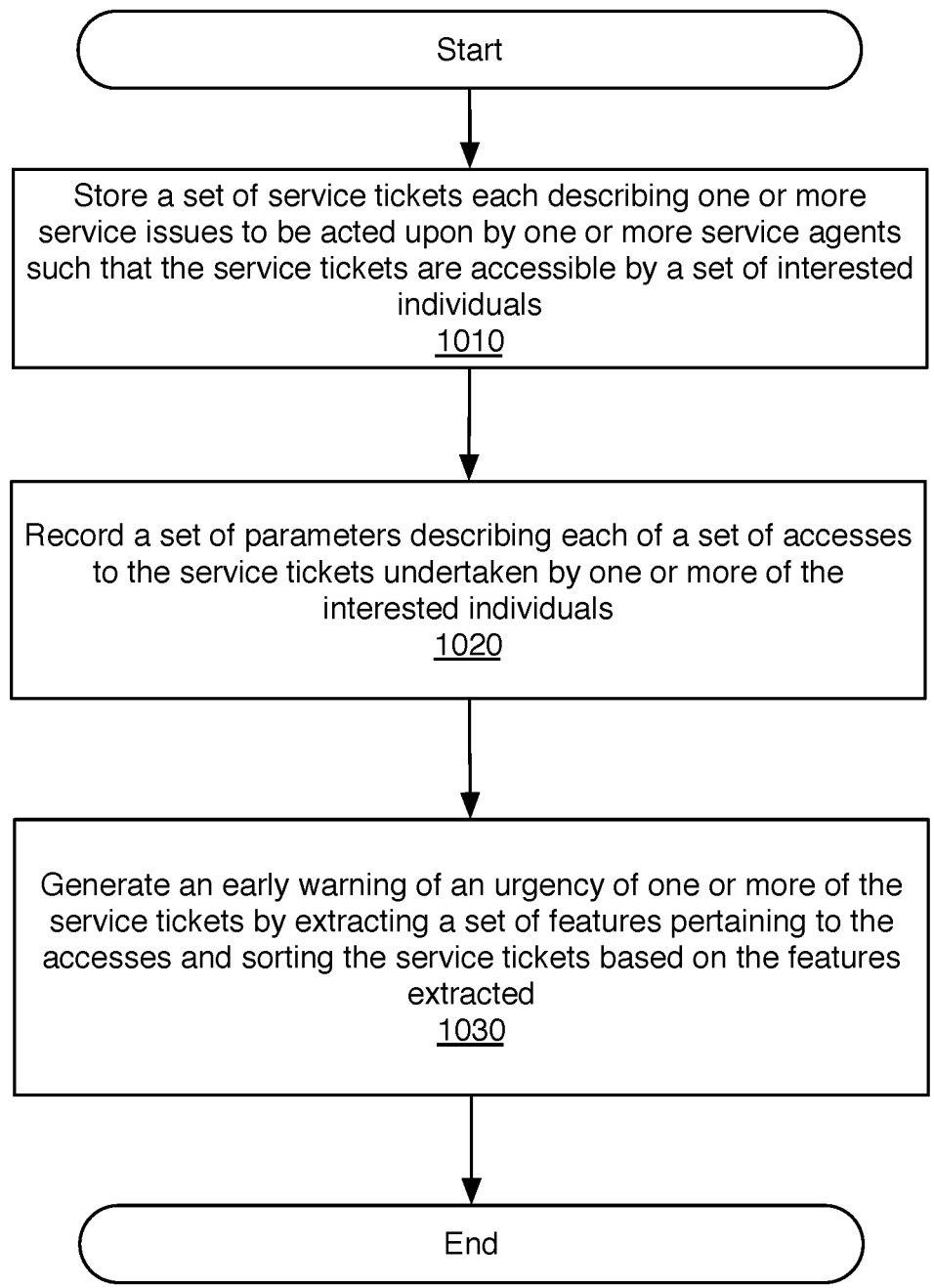
FIG. 10 illustrates a method for service tickets early warnings in one or more embodiments.

FIG. 10 illustrates a method for service tickets early warnings in one or more embodiments. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 10 should not be construed as limiting the scope of the invention.

At step 1010, a set of service tickets each describing one or more service issues to be acted upon by one or more service agents are stored such that the service tickets are accessible by a set of interested individuals. The service tickets can be stored in a service tickets queue that distributes the service tickets to a group of service agents according to a nominal queuing scheme, e.g., first-in-first-out, priorities assigned to service tickets when created, etc.

At step 1020, a set of parameters are recorded describing each of a set of accesses to the service tickets undertaken by one or more of the interested individuals. The parameters can be preselected based on features of the accesses that facilitate detecting an urgency of the service tickets, e.g., access counts, timing, annotation content, etc.

At step 1030, an early warning of an urgency of one or more of the service tickets is generated by extracting a set of features pertaining to the accesses and sorting the service tickets based on the features extracted. The features extracted can be preselected and weighted based on a utility in indicating the urgency.

Figure 11:
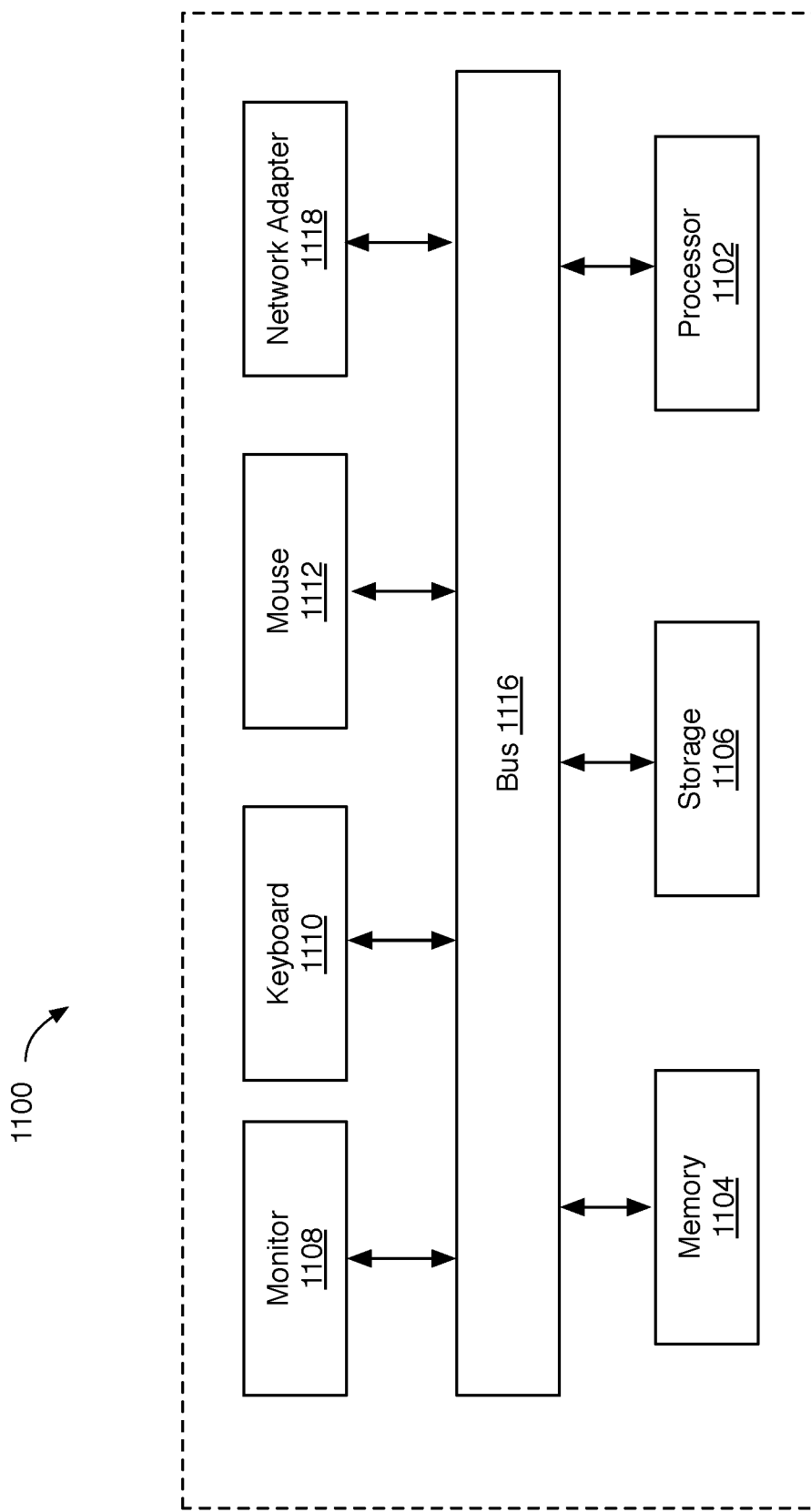
FIG. 11 illustrates a computing system upon which portions of a service tickets early warning system can be implemented.

FIG. 11 illustrates a computing system 1100 upon which portions of the service tickets early warning system 100 can be implemented. The computing system 1100 includes one or more computer processor(s) 1102, associated memory 1104 (e.g., random access memory (RAM), cache memory, flash memory, etc.), one or more storage device(s) 1106 (e.g., a hard disk, an optical drive such as a compact disk (CD) drive or digital versatile disk (DVD) drive, a flash memory stick, etc.), a bus 1116, and numerous other elements and functionalities. The computer processor(s) 1102 may be an integrated circuit for processing instructions. For example, the computer processor(s) may be one or more cores or micro-cores of a processor. The computing system 1100 may also include one or more input device(s), e.g., a touchscreen, keyboard 1110, mouse 1112, microphone, touchpad, electronic pen, or any other type of input device. Further, the computing system 1100 may include one or more monitor device(s) 1108, such as a screen (e.g., a liquid crystal display (LCD), a plasma display, touchscreen, cathode ray tube (CRT) monitor, projector, or other display device), external storage, input for an electric instrument, or any other output device. The computing system 1100 may be connected to, e.g., a local area network (LAN), a wide area network (WAN) such as the Internet, mobile network, or any other type of network) via a network adapter 1118.

While the foregoing disclosure sets forth various embodiments using specific diagrams, flowcharts, and examples, each diagram component, flowchart step, operation, and/or component described and/or illustrated herein may be implemented, individually and/or collectively, using a range of processes and components.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While the invention has been described with respect to a limited number of embodiments, those skilled in the art, having benefit of this disclosure, will appreciate that other embodiments may be devised which do not depart from the scope of the invention as disclosed herein.

What is claimed is:

1. A service tickets warning system, comprising:
   a computing store for holding a set of service tickets, each service ticket describing one or more service issues to be acted upon by one or more service agents;
   a computing mechanism for generating an access log for holding a set of parameters describing each of a set of accesses to the service tickets undertaken by one or more of a set of interested individuals; and
   a computing mechanism for generating a warning of an urgency of one or more of the service tickets in response to the parameters recorded in the access log, wherein the computing mechanism for generating a warning comprises
   a first feature extractor for extracting a first set of features for each service ticket such that the first set of features are based on a first aspect of the accesses;
   a first ticket sorter for identifying which of the service tickets exhibits the urgency by clustering the service tickets based on the first set of features;
   a second feature extractor for extracting a second set of features for each service ticket such that the second set of features are based on a second aspect of the accesses;
   a second ticket sorter for identifying which of the service tickets exhibits the urgency by clustering the service tickets based on the second set of features; and
   an overlap detector for identifying one or more of the service tickets identified by both the first and second ticket sorters as the basis of the warning.

2. The service tickets warning system of claim 1, wherein at least one of the parameters recorded in the access log pertains to a rank of at least one of the interested individuals.

3. The service tickets warning system of claim 1, wherein at least one of the parameters recorded in the access log pertains to an importance of an organization associated with at least one of the interested individuals.

4. The service tickets warning system of claim 1, wherein at least one of the parameters recorded in the access log pertains to a timing of one or more of the accesses.

5. The service tickets warning system of claim 1, wherein at least one of the parameters recorded in the access log pertains to a number of the accesses.

6. The service tickets warning system of claim 1, wherein at least one of the parameters recorded in the access log pertains to a content indicating urgency in at least one of the accesses.

7. The service tickets warning system of claim 1, wherein at least one of the parameters recorded in the access log pertains to a voluminousness of a content in at least one of the accesses.

8. The service tickets warning system of claim 1, further comprising a learning system for identifying the first and second sets of features to be extracted and for determining a set of corresponding weights for the features in response to a service tickets history.

9. A method for service tickets warnings, comprising:
storing a set of service tickets in a service tickets store such that the service tickets are accessible by a set of interested individuals, each service ticket describing one or more service issues to be acted upon by one or more service agents;
recording a set of parameters in an access log describing each of a set of accesses to the service tickets store undertaken by one or more of the interested individuals; and
generating a warning of an urgency of one or more of the service tickets in response to the parameters recorded in the access log, wherein generating a warning comprises
extracting a first set of features for each service ticket from the parameters such that the first set of features are based on a first aspect of the accesses;
identifying which of the service tickets exhibits the urgency by clustering the service tickets based on the first set of features;
extracting a second set of features for each service ticket from the parameters such that the second features are based on a second aspect of the accesses;
identifying which of the service tickets exhibits the urgency by clustering the service tickets based on the second set of features; and
identifying one or more of the service tickets identified by both the first and second aspects of the accesses as the basis of the warning.

10. The method of claim 9, wherein recording comprises recording a rank of at least one of the interested individuals.

11. The method of claim 9, wherein recording comprises recording an importance of an organization associated with at least one of the interested individuals.

12. The method of claim 9, wherein recording comprises recording a timing of one or more of the accesses.

13. The method of claim 9, wherein recording comprises recording a number of the accesses.

14. The method of claim 9, wherein recording comprises recording a content indicating urgency in at least one of the accesses.

15. The method of claim 9, wherein recording comprises recording a voluminousness of a content in at least one of the accesses.

16. The method of claim 9, further comprising identifying the first and second sets of features to be extracted from the access log and generating a set of corresponding weights for the features in response to a service tickets history.

* * * * *